United States Patent
Izumi et al.

(10) Patent No.: US 8,880,217 B2
(45) Date of Patent: Nov. 4, 2014

(54) PICKING SYSTEM

(75) Inventors: Tetsuro Izumi, Kitakyushu (JP);
Kenichi Koyanagi, Kitakyushu (JP);
Kenji Matsukuma, Kitakyushu (JP);
Yukio Hashiguchi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 303 days.

(21) Appl. No.: 13/337,818

(22) Filed: Dec. 27, 2011

(65) Prior Publication Data

US 2012/0323358 A1 Dec. 20, 2012

(30) Foreign Application Priority Data

Jun. 20, 2011 (JP) ................ 2011-136328

(51) Int. Cl.
*G06F 7/00* (2006.01)
*G06K 9/34* (2006.01)

(52) U.S. Cl.
CPC ........................ *G06K 9/34* (2013.01)
USPC ........... 700/230; 700/259; 414/729; 198/358; 198/459.1

(58) Field of Classification Search
USPC ........................................................ 700/230
See application file for complete search history.

(56) References Cited

U.S. PATENT DOCUMENTS

| | | | |
|---|---|---|---|
| 5,040,056 A * | 8/1991 | Sager et al. | 348/88 |
| 8,418,830 B2 * | 4/2013 | Salamanca | 198/358 |
| 2006/0104788 A1 * | 5/2006 | Ban et al. | 414/729 |
| 2008/0023295 A1 * | 1/2008 | Noguchi et al. | 198/459.1 |
| 2009/0139832 A1 * | 6/2009 | Sato et al. | 198/358 |

FOREIGN PATENT DOCUMENTS

| | | |
|---|---|---|
| CN | 1699033 | 11/2005 |
| JP | 05-165525 | 7/1993 |
| JP | 3225740 B2 | 12/1995 |
| JP | 08-323669 | 12/1996 |
| JP | 09-262784 | 10/1997 |
| JP | 11-114860 | 4/1999 |
| JP | 2000-289852 | 10/2000 |
| JP | 2000-326273 | 11/2000 |
| JP | 2010-091429 | 4/2010 |
| JP | 2011-167815 | 9/2011 |
| JP | 2012-055995 | 3/2012 |

OTHER PUBLICATIONS

Japanese Office Action for corresponding JP Application No. 2011-136328, Aug. 6, 2013.
Chinese Office Action for corresponding CN Application No. 201210017894.6, Jul. 18, 2014.

* cited by examiner

*Primary Examiner* — Gene Crawford
*Assistant Examiner* — Kyle Logan
(74) *Attorney, Agent, or Firm* — Mori & Ward, LLP

(57) ABSTRACT

A picking system includes a conveyer, a robot, a main camera, and a control device. The conveyer conveys workpieces. The robot performs a holding operation and a moving operation on the workpieces. The main camera captures the transport path of the conveyer. The control device detects the workpiece on the basis of the image captured by the main camera and instructs the robot to perform the holding operation on the detected workpiece. Moreover, the control device instructs the robot to perform the holding operation on the overlapped workpieces when the overlapping of the workpieces is detected.

18 Claims, 5 Drawing Sheets

PICKING SYSTEM

CROSS-REFERENCE TO RELATED APPLICATION

This application is based upon and claims the benefit of priority of the prior Japanese Patent Application No. 2011-136328, filed on Jun. 20, 2011, the entire contents of which are incorporated herein by reference.

FIELD

The embodiment discussed herein is directed to a picking system.

BACKGROUND

For example, a picking system, which performs a speed control on a conveying device in accordance with a supplied amount of workpieces, has been known as disclosed in, Japanese Laid-open Patent Publication No. 2000-289852.

However, there was a possibility that the picking system fails in the picking of workpieces. For example, when workpieces are conveyed in the state where they are overlapped, the conventional picking system determines that the overlapped workpieces are defectives and does not perform a holding operation to be performed by a robot. For this reason, there was a possibility that the picking system may not pick workpieces that are non-defective units.

SUMMARY

A picking system according to an aspect of an embodiment includes a conveying device, a robot, an image capturing device, and a control device. The conveying device conveys workpieces. The robot performs a holding operation for holding the workpieces conveyed by the conveying device and a moving operation for moving the held workpieces to a predetermined place. The image capturing device is provided at the upper stream side of the conveying device than the robot to capture the transport path of the conveying device. The control device detects the workpieces on the transport path on the basis of the image captured by the image capturing device and instructs the robot to perform the holding operation on the detected workpieces. Moreover, the control device includes a detecting unit and an operation instruction unit. The detecting unit detects the overlapping of the workpieces. The operation instruction unit instructs the robot to perform the holding operation on the overlapped workpieces when the overlapping of the workpieces is detected by the overlapping detecting unit.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Figure 1:
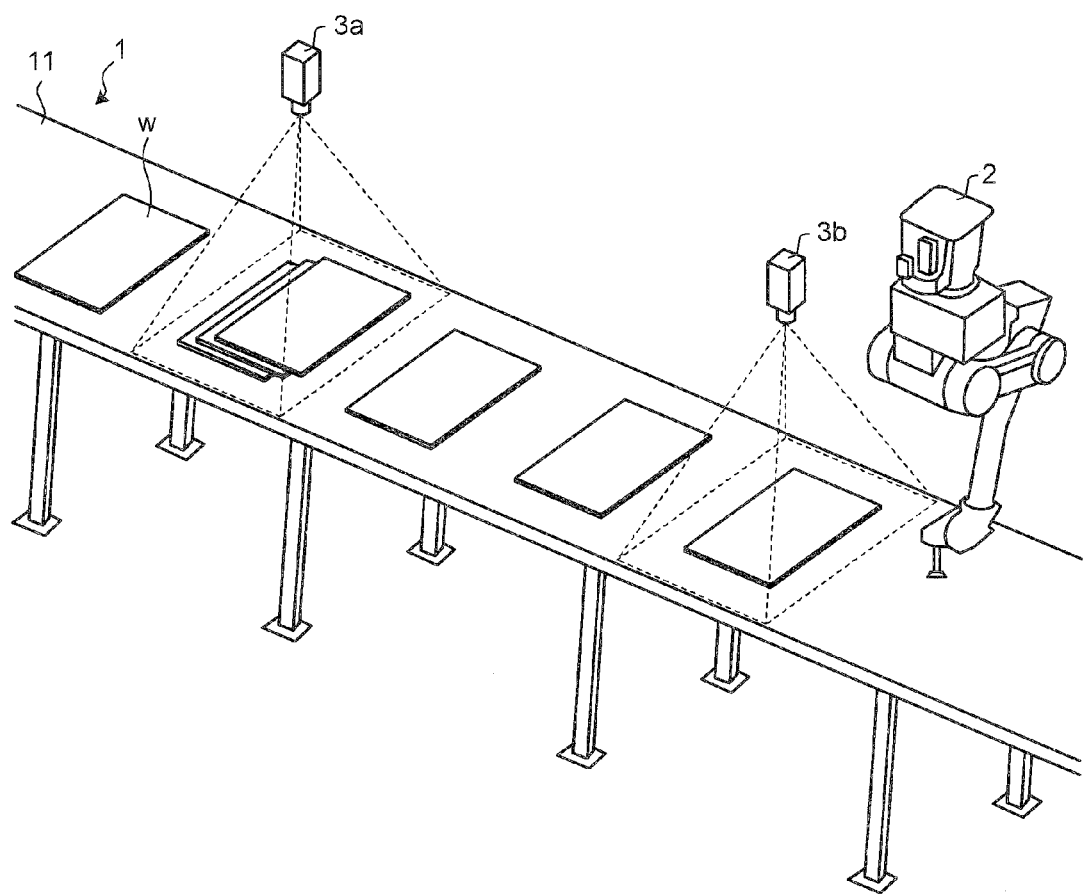
FIG. 1 is a pattern perspective view of a picking system according to an embodiment.

First, the appearance of a picking system according to an embodiment of the present disclosure will be explained with reference to FIG. 1. FIG. 1 is a pattern perspective view of the picking system according to the embodiment. Hereinafter, it is explained that the picking system includes one robot. However, the picking system may include two or more robots.

As illustrated in FIG. 1, the picking system according to the present embodiment includes a conveyer 1, a robot 2, a main camera 3a, and a sub camera 3b. The conveyer 1 is a conveying device that conveys a workpiece w placed on a transport path 11 from the upper stream side to the lower stream side. The conveyance speed of the conveyer 1 is controlled by a control device to be described below. Herein, it is explained that the conveyer 1 is a belt conveyor as an example. However, the conveyer 1 may be a conveying device other than the belt conveyor.

The robot 2 is an articulated robot that is fixed on a ceiling, a wall surface, a floor, or the like. The robot 2 performs a holding operation for holding the workpiece w conveyed by the conveyer 1 and a moving operation for moving the held workpiece w to a predetermined place.

For example, the robot 2 includes an adsorption part that adsorbs the workpiece w by using a suction device such as a vacuum pump as an end effector (holding part) to hold the workpiece w by using the adsorption part. Moreover, the robot 2 moves the held workpiece w to another conveyer (not illustrated) and then places the held workpiece w on the other conveyer by removing an attractive force made by the suction device.

Herein, it is explained that the robot 2 includes an adsorption part as an end effector. However, the robot 2 may include an end effector other than the adsorption part. For example, the robot 2 may include a hand-type end effector that grips the workpiece w.

It is explained in the embodiment that the robot 2 employs a vertical articulated robot. However, the configuration of the robot is not limited to this. In other words, it is only sufficient that the robot 2 is a robot, which can hold and transfer the workpiece w, such as a horizontal articulated robot, a parallel link robot, and an orthogonal robot.

The main camera 3a is an image capturing device that captures a predetermined region on the transport path 11 of the conveyer 1. The main camera 3a is placed at the upper stream side of the conveyer 1 than the robot 2. An image captured by the main camera 3a is output to the control device (not illustrated) via a communication network such as a local area network (LAN).

The sub camera 3b is an auxiliary image capturing device that captures a predetermined region on the transport path 11 of the conveyer 1. The sub camera 3b is placed between the main camera 3a and the robot 2, more specifically, near the robot 2. The sub camera 3b performs image processing only when the abnormality of the workpiece w is detected by an abnormality detection process to be described below. An image captured by the sub camera 3b is output to the control device (not illustrated) via a communication network such as LAN. Herein, the sub camera 3b is a camera that has a higher resolution than that of the main camera 3a.

In the picking system according to the present embodiment, the main camera 3a captures a region on the transport path 11, and the control device (not illustrated) detects the workpiece w on the transport path 11 on the basis of the image captured by the main camera 3a and instructs the robot 2 to perform a holding operation on the detected workpiece w. Then, the robot 2 performs a holding operation and a moving operation in accordance with the instruction of the control device.

Herein, when an operation process performed at the upper stream side than the main camera 3a has a trouble in the picking system, for example, there is a possibility that the workpieces w are overlapped and conveyed (see FIG. 1). In this case, a picking system determines that the overlapped and conveyed workpieces are a defective and does not perform the holding operation to be performed by the robot. For this reason, the picking system has a possibility that the non-defective workpieces may be unpicked.

Therefore, according to the embodiment, the control device performs a process for detecting whether the workpieces w are overlapped and instructs the robot 2 to hold the overlapped workpieces w in sequence from top when the overlapping of the workpieces w are detected. Hereinafter, the configuration and operation of the control device is specifically explained.

Figure 2:
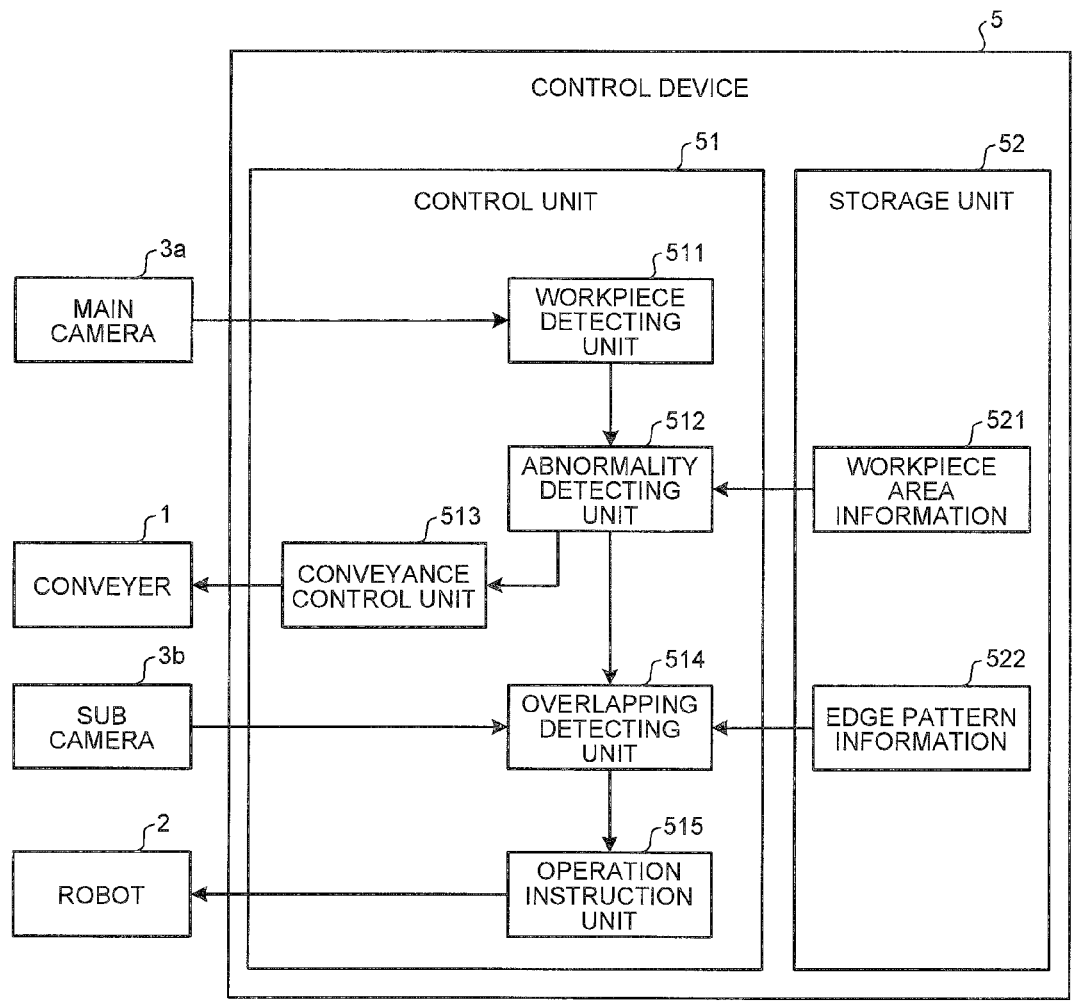
FIG. 2 is a block diagram illustrating the configuration of a control device according to the embodiment.

FIG. 2 is a block diagram illustrating the configuration of a control device 5 according to the present embodiment. Only components needed to explain the characteristics of the control device are illustrated in FIG. 2, and the descriptions on general components are omitted.

As illustrated in FIG. 2, the control device 5 includes a control unit 51 and a storage unit 52. The control unit 51 includes a workpiece detecting unit 511, an abnormality detecting unit 512, a conveyance control unit 513, an overlapping detecting unit 514, and an operation instruction unit 515. Moreover, the storage unit 52 stores therein workpiece area information 521 and edge pattern information 522.

The control unit 51 totally controls the control device 5. The control unit 51 is constituted by a central processing unit (CPU), a microprocessor, or the like. The workpiece detecting unit 511 is a processing unit that detects the workpiece w on the transport path 11 on the basis of the image input from the main camera 3a.

In the present embodiment, the workpiece detecting unit 511 detects a border line between the transport path 11 and the workpiece w, that is to say, a silhouette of the workpiece w. Therefore, when the three workpieces w are overlapped and conveyed as illustrated in FIG. 1, the workpiece detecting unit 511 detects a shape illustrated in FIG. 3 as a workpiece wd.

The detection process of the workpiece w performed by the workpiece detecting unit 511 can be performed by using any well-known technology.

The abnormality detecting unit 512 is a processing unit that detects the abnormality of the workpiece w on the basis of the detection result of the workpiece w performed by the workpiece detecting unit 511 and the workpiece area information 521 stored in the storage unit 52. The workpiece area information 521 is information that indicates an area (square measure) of the workpiece w when viewing the workpiece w on the transport path 11 from the vertical upper side. The workpiece area information 521 is previously stored in the storage unit 52 by an operator or the like.

Figure 3:
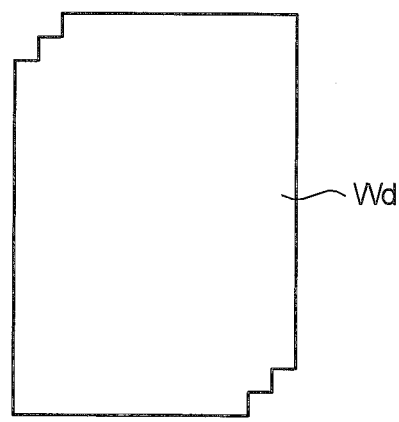
FIG. 3 is a diagram illustrating an example of the detection result that is performed by a workpiece detecting unit.

Herein, the abnormality detection process performed by the abnormality detecting unit 512 is explained with reference to FIG. 3. FIG. 3 is a diagram illustrating an example of the detection result that is performed by the workpiece detecting unit 511.

As illustrated in FIG. 3, the abnormality detecting unit 512 measures the area of the workpiece wd detected by the workpiece detecting unit 511. Then, the abnormality detecting unit 512 compares the measured area (hereinafter, "measured workpiece area") with the area of the workpiece w (hereinafter, "reference workpiece area") indicated by the workpiece area information 521. At this time, when the measured workpiece area exceeds the reference workpiece area, the abnormality detecting unit 512 detects abnormality of the workpiece wd.

Herein, it has been explained that abnormality is detected because the non-defective workpieces w are overlapped and conveyed. However, even when the defective workpiece w of which the area exceeds the reference workpiece area is conveyed because a process such as a press is not appropriately performed, there is a possibility that abnormality is detected. In other words, it is not determined whether the workpiece wd that has the detected abnormality is a defective or not at this point.

Upon detecting the abnormality of the workpiece wd, the abnormality detecting unit 512 outputs the notice that abnormality is detected to the overlapping detecting unit 514 and instructs the conveyance control unit 513 to perform a speed control on the conveyer 1. On the other hand, when abnormality is not detected, the abnormality detecting unit 512 outputs the detection result of the workpiece w received from the workpiece detecting unit 511 to the operation instruction unit 515.

The control unit 51 is continuously explained again with reference to FIG. 2. When the abnormality of the workpiece w is detected by the abnormality detecting unit 512, the conveyance control unit 513 is a processing unit that controls the conveyance speed of the conveyer 1. More specifically, the conveyance control unit 513 performs a process for reducing the conveyance speed of the conveyer 1.

In other words, the robot 2 may not hold all the overlapped workpieces w at a normal conveyance speed. Even in this case, the conveyance control unit 513 reduces the conveyance speed of the conveyer 1 and thus the robot 2 can hold all the overlapped workpieces w.

The conveyance control unit 513 may stop the conveyer 1 at the time at which the workpiece wd that has the detected abnormality is located within the image capturing region of the sub camera 3b. In this way, the robot 2 can more surely hold all the overlapped workpieces w by stopping the conveyer 1.

When the notice that the abnormality of the workpiece wd is detected is received from the abnormality detecting unit 512, the overlapping detecting unit 514 is a processing unit that detects the overlapping of the workpieces w with respect to the workpiece wd. More specifically, the overlapping detecting unit 514 detects the overlapping of the workpieces w by using the image captured by the sub camera 3b and the edge pattern information 522 stored in the storage unit 52.

The edge pattern information 522 is information that indicates the shape of the outline of the workpiece w (hereinafter, "reference edge pattern") when viewing the workpiece w on the transport path 11 from the vertical upper side. The edge pattern information 522 is previously stored in the storage unit 52 by the operator or the like.

Figure 4:
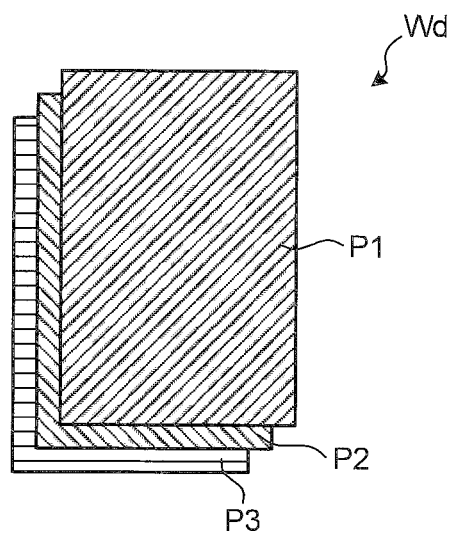
FIGS. 4 and 5 are diagrams illustrating an example of an image that is captured by a sub camera.

Now, an overlapping detection process performed by the overlapping detecting unit 514 is explained with reference to FIG. 4. FIG. 4 is a diagram illustrating an example of an image that is captured by the sub camera 3b.

As illustrated in FIG. 4, the overlapping detecting unit 514 acquires the image of the workpiece wd (actually, the three overlapped workpieces w) that has the detected abnormality from the sub camera 3b. The time at which the workpiece wd is captured by the sub camera 3b can be calculated from the distance between the main camera 3a and the sub camera 3b and the conveyance speed of the conveyer 1, for example.

Next, the overlapping detecting unit 514 performs an edge detection process on the image captured by the sub camera 3b. The overlapping detecting unit 514 performs the edge detection process to detect the outlines of the overlapped and conveyed workpieces w. In addition, the edge detection process may be performed by using any well-known technology.

Next, the overlapping detecting unit 514 performs an edge pattern matching by using the edge pattern information 522. In FIG. 4, three edge patterns are detected, which are an edge pattern P1 indicated by a right diagonal line, an edge pattern P2 indicated by a left diagonal line, and an edge pattern P3 indicated by a transverse line. Because the edge pattern P1 among them is identical with the reference edge pattern indicated by the edge pattern information 522, the overlapping detecting unit 514 detects the overlapping of the workpieces w.

The sub camera 3b does not always perform image processing but starts the image processing when the abnormality of the workpiece w is detected by the abnormality detecting unit 512. By doing so, a power consumption of the picking system can be suppressed. In addition, the start and end of image processing performed by the sub camera 3b are controlled by the control unit 51.

Upon detecting the overlapping of the workpieces w, the overlapping detecting unit 514 outputs the detection result of the edge detection process to the operation instruction unit 515. On the other hand, when the overlapping of the workpieces w is not detected, the overlapping detecting unit 514 determines that the workpiece w that has the detected abnormality is a defective and outputs that effect to a high-order device (not illustrated). The workpiece w that is a defective as the determination result is not held by the robot 2 but is conveyed to the lower stream side of the conveyer 1.

Whenever the holding operation on the overlapped workpieces w is performed by the robot 2, the overlapping detecting unit 514 again detects the overlapping of the workpieces w by using the image captured by the sub camera 3b after the holding operation. After the workpiece w that has the edge pattern P1 illustrated in FIG. 4 is held by the robot 2, an image captured by the sub camera 3b is illustrated in FIG. 5.

Figure 5:
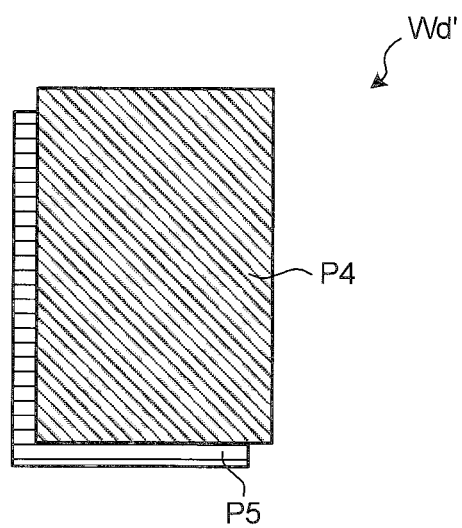

As illustrated in FIG. 5, the overlapping detecting unit 514 acquires, from the sub camera 3b, an image of a workpiece wd' (actually, two overlapped workpieces w) after the workpiece w of the edge pattern P1 is held by the robot 2. Next, the overlapping detecting unit 514 performs the edge detection process on the acquired image, and performs the edge pattern matching using the edge pattern information 522 on the detection result.

As illustrated in FIG. 5, two edge patterns are detected, which are an edge pattern P4 indicated by a left diagonal line and an edge pattern P5 indicated by a transverse line. Because the edge pattern P4 among them is identical with the reference edge pattern indicated by the edge pattern information 522, the overlapping detecting unit 514 detects the overlapping of the workpieces w. In addition, the workpiece w of the edge pattern P4 is the same as the workpiece w of the edge pattern P2 illustrated in FIG. 4 and the workpiece w of the edge pattern P5 is the same as the workpiece w of the edge pattern P3 illustrated in FIG. 4.

The control unit 51 is continuously explained again with reference to FIG. 2. The operation instruction unit 515 is a processing unit that instructs the robot 2 to perform the holding operation and the moving operation on the workpiece w on the basis of the detection result of the workpiece w performed by the workpiece detecting unit 511 or the detection result of the edge detection process performed by the overlapping detecting unit 514.

The operation instruction unit 515 instructs the robot 2 to perform the holding operation on the top workpiece w among the overlapped workpieces w, that is to say, the workpiece w that corresponds to an edge pattern identical with the reference edge pattern in the edge pattern matching, on the basis of the detection result of the edge detection process.

Herein, as described above, whenever the holding operation on the overlapped workpieces w is performed by the robot 2, the overlapping detecting unit 514 performs the overlapping detection process. Moreover, whenever the overlapping of the workpieces w is detected by the overlapping detecting unit 514, the operation instruction unit 515 instructs the robot 2 to perform the holding operation on the top workpiece w among the overlapped workpieces w. As a result, the robot 2 holds the overlapped and conveyed workpieces w in sequence from top.

Therefore, even if the workpieces w are overlapped and conveyed, the picking system according to the present embodiment can make the robot 2 hold the workpieces without determining that the workpieces are a defective.

The storage unit 52 is explained again with reference to FIG. 2. The storage unit 52 is constituted by a storage device such as for example a nonvolatile memory and a hard disk drive. The storage unit 52 stores the workpiece area information 521 and the edge pattern information 522. The workpiece area information 521 is information that indicates a reference workpiece area. The edge pattern information 522 is information that indicates a reference edge pattern.

Figure 6:
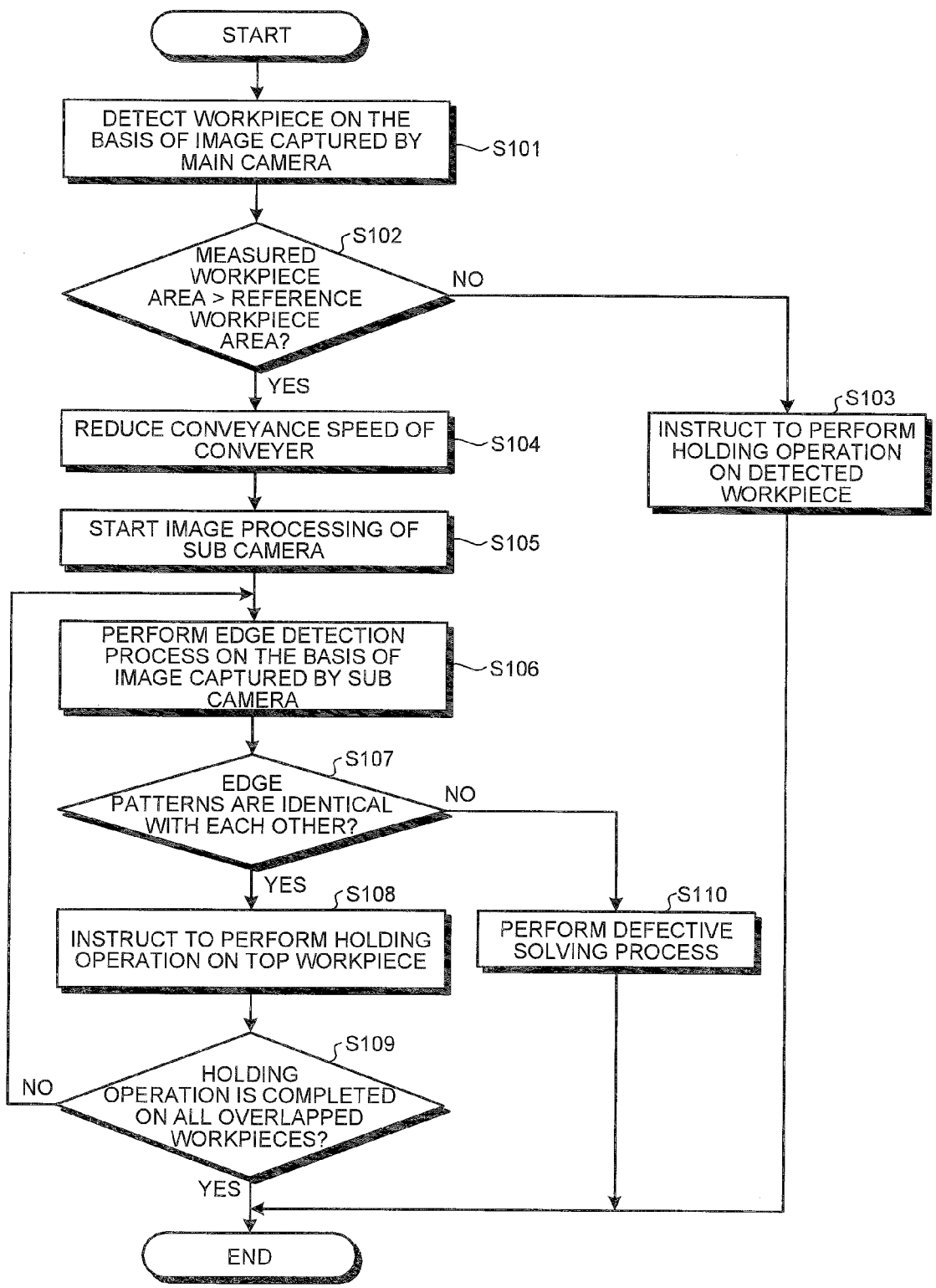
FIG. 6 is a flowchart illustrating a routine that is performed by the control device.

Next, the specific operations of the control device 5 are explained with reference to FIG. 6. FIG. 6 is a flowchart illustrating a routine that is performed by the control device 5.

As illustrated in FIG. 6, the workpiece detecting unit 511 of the control device 5 acquires an image from the main camera 3a and detects the workpiece w on the basis of the acquired image (Step S101).

The abnormality detecting unit 512 of the control device 5 performs the abnormal determination process on the basis of the detection result performed by the workpiece detecting unit 511. More specifically, the abnormality detecting unit 512 measures the area of the workpiece w from the detection result performed by the workpiece detecting unit 511, and determines whether the measured workpiece area exceeds the reference workpiece area (Step S102). When the measured workpiece area does not exceed the reference workpiece area in the process (Step S102: No), the operation instruction unit 515 instructs the robot 2 to perform the holding operation on the workpiece w detected by the workpiece detecting unit 511 (Step S103), and terminates the process.

On the other hand, when the abnormality detecting unit 512 determines that the measured workpiece area exceeds the reference workpiece area (Step S102: Yes), the conveyance control unit 513 reduces the conveyance speed of the conveyer 1 (Step S104) and the control unit 51 makes the sub camera 3b start the image processing (Step S105). The processes of Steps S104 and S105 may have an inverse sequence.

Next, the overlapping detecting unit 514 of the control device 5 acquires the image captured by the sub camera 3b and performs the edge detection process on the basis of the acquired image (Step S106). Moreover, the overlapping detecting unit 514 determines whether the detected edge pattern is identical with the reference edge pattern (Step S107).

When it is determined that the detected edge pattern is identical with the reference edge pattern in the process (Step S107: Yes), the operation instruction unit 515 instructs the robot 2 to perform the holding operation on the top workpiece w among the overlapped workpieces w (Step S108).

The control unit 51 determines whether the holding operation is completed on all the overlapped workpieces w (Step S109). For example, when a further edge pattern is detected in the edge detection process, the control unit 51 determines that the holding operation is not completed on all the overlapped workpieces w (Step S109: No). In this case, the control device 5 repeats the processes of Steps S106 to S109 until the holding operation is completed on all the overlapped workpieces w. When it is determined that the holding operation is completed on all the overlapped workpieces w (Step S109: Yes), the control device 5 terminates the process.

When the detected edge pattern is not identical with the reference edge pattern at Step S107 (Step S107: No), the control unit 51 performs, for example, a predetermined defective solving process in which the effect that the defective is conveyed is reported to a high-order device (not illustrated) (Step S110), and then terminates the process.

As described above, it has been explained in the present embodiment that the overlapping detecting unit detects the overlapping of workpieces and the operation instruction unit instructs the robot to perform the holding operation on the overlapped workpieces when the overlapping of the workpieces is detected by the overlapping detecting unit. Therefore, according to the present embodiment, the unpicking of the overlapped and conveyed workpieces can be prevented.

It has been explained in the present embodiment that the abnormality detecting unit detects the abnormality of workpieces on the basis of the image captured by the image capturing device and the workpiece area information. Therefore, according to the present embodiment, the abnormality of the workpieces can be detected in comparatively low throughput.

It has been explained in the present embodiment that the overlapping detecting unit performs the edge detection process to detect the overlapping of workpieces when the abnormality of the workpieces is detected by the abnormality detecting unit.

In other words, assuming that the edge detection process is always performed on the conveyed workpieces w, there is a possibility that a throughput increases and thus the entire work efficiency on the picking system decreases. Therefore, because the abnormality detection process (workpiece area measurement process) that has lower throughput than that of the edge detection process is first performed and the edge detection process is performed on only the workpiece that has the detected abnormality, the overlapping of the workpieces w can be detected without reducing work efficiency as much as possible.

It has been explained in the present embodiment that the sub camera is provided near the robot and the overlapping detecting unit performs the edge detection process on the image captured by the sub camera to detect the overlapping of the workpieces. In other words, it has been explained in the present embodiment that the workpiece detection process and the abnormality detection process are performed by using the image captured by the main camera and the edge detection process is performed by using the image captured by the sub camera. Therefore, according to the present embodiment, the degradation of processing speeds of the workpiece detection process and the abnormality detection process can be suppressed.

More specifically, the edge detection process requires comparatively high resolution (information amount). For this reason, the case where the workpiece detection process, the abnormality detection process, and the edge detection process are performed by using the image captured by the main camera requires capturing a workpiece at high resolution in comparison with the case where only the workpiece detection process and abnormality detection process are performed. As a result, because the workpiece detection process and the abnormality detection process are performed on the basis of the image captured at high resolution, there is a possibility that a throughput increases uselessly and thus a processing speed decreases.

For this reason, an image for the workpiece detection process and the abnormality detection process is captured by the main camera, and an image for the edge detection processes that requires a higher resolution than that of these processes is captured by the sub camera that has a higher resolution than that of the main camera. As a result, the degradation of processing speeds of the workpiece detection process and the abnormality detection process can be suppressed.

In the present embodiment, the overlapping detecting unit again detects the overlapping of workpieces by using the image captured by the sub camera after the holding operation whenever the holding operation is performed by the robot on the overlapped workpieces. Moreover, in the present embodiment, the operation instruction unit instructs the robot to perform the holding operation on the top workpiece among the overlapped workpieces whenever the overlapping of the workpieces is detected by the overlapping detecting unit. Therefore, the robot can hold the overlapped and conveyed workpieces in sequence from top. Moreover, because the sub camera is provided near the robot, the top workpiece is held by the robot and then the overlapped workpieces can be again captured.

Meanwhile, it has been explained in the embodiment that the workpieces w are simply overlapped. Because the holding operation of the robot depends on the overlapping condition of the workpieces w, it can be difficult to hold the workpieces w in sequence from top by using the robot 2 in some cases.

In such a case, an operation for resolving overlapping, such as an operation for shifting the positions of the overlapped workpieces w, may be performed by the robot 2. By performing the operation, the holding operation of the overlapped workpieces w may become easy.

Moreover, when it is difficult to still hold the overlapped workpieces w even if the operation for resolving overlapping is performed by the robot 2, an operator may resolve the overlapping of the workpieces w.

For example, the control unit 51 may perform a predetermined report process such as a process for emitting a warning sound from a speaker (not illustrated) and a process for making a display (not illustrated) display the effect that the overlapping of the workpieces w is caused. By doing so, the operator can easily find the overlapping of the workpieces w and thus can resolve the overlapping.

It has been explained in the embodiment that the sub camera 3b is provided near the robot 2. However, the sub camera 3b may be directly provided on the robot 2.

It has been explained in the embodiment that the picking system includes two cameras of the main camera 3a and the sub camera 3b. The picking system does not necessarily include the sub camera 3b. In other words, the control device may perform the workpiece detection process, the abnormality detection process, and the edge detection process by using the image captured by the main camera 3a.

In this case, the control device makes the robot 2 hold the top workpiece w among the overlapped workpieces w and then backward moves the conveyer 1 to again capture the remaining overlapped workpieces w by using the main camera 3a.

It has been explained in the embodiment that the conveyance control unit 513 reduces the conveyance speed of the conveyer 1 when the abnormality is detected by the abnormality detecting unit 512. However, the conveyance control unit 513 may control the conveyance speed of the conveyer 1 in accordance with the detection result of the edge detection process performed by the overlapping detecting unit 514.

For example, the conveyance control unit 513 further reduces the conveyance speed of the conveyer 1 or stops the conveyer 1 when the number of edge patterns detected by the edge detection process is not less than a predetermined threshold value. By doing so, the holding operation of the robot 2 can be surely performed on all the overlapped workpieces w.

It has been explained in the embodiment that the abnormality detecting unit 512 detects abnormality by comparing the area of the workpiece w detected by the workpiece detecting unit 511 and the reference workpiece area. However, the aspect of the abnormality detection process is not limited to this. For example, the abnormality detecting unit 512 may detect abnormality in accordance with whether the silhouette of the workpiece w detected by the workpiece detecting unit 511 is identical with the silhouette of the reference workpiece w.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A picking system comprising:
    a conveying device that conveys workpieces;
    a robot that performs a holding operation for holding the workpieces conveyed by the conveying device and a moving operation for moving the held workpieces to a predetermined place;
    an image capturing device that is provided at an upper stream side of the conveying device than the robot to capture a transport path of the conveying device; and
    a control device that detects the workpieces on the transport path on the basis of an image captured by the image capturing device and instructs the robot to perform the holding operation on the detected workpieces, and
    the control device including:
        an abnormality detecting unit that detects abnormality of the workpieces on the basis of the image captured by the image capturing device and area information of the workpieces;
        an overlapping detecting unit that performs an edge detection process to detect overlapping of the workpieces when abnormality of the workpieces is detected by the abnormality detecting unit; and
        an operation instruction unit that instructs the robot to perform the holding operation on the overlapped workpieces when the overlapping of the workpieces is detected by the overlapping detecting unit, and that determines that the workpiece that has abnormality detected by the abnormality detecting unit is defective when the overlapping of the workpieces is not detected by the overlapping detecting unit.

2. The picking system according to claim 1, further comprising an auxiliary image capturing device that is provided near the robot or on the robot to capture the transport path, wherein the overlapping detecting unit performs the edge detection process on an image captured by the auxiliary image capturing device to detect overlapping of the workpieces.

3. The picking system according to claim 1, wherein the control device starts image processing performed by the auxiliary image capturing device when the abnormality of the workpieces is detected by the abnormality detecting unit.

4. The picking system according to claim 1, wherein the control device starts image processing performed by the auxiliary image capturing device when the abnormality of the workpieces is detected by the abnormality detecting unit.

5. The picking system according to claim 2, wherein the operation instruction unit determines that the workpiece that has abnormality detected by the abnormality detecting unit is a defective when the overlapping of the workpieces is not detected by the overlapping detecting unit.

6. The picking system according to claim 2, wherein the control device starts image processing performed by the auxiliary image capturing device when the abnormality of the workpieces is detected by the abnormality detecting unit.

7. The picking system according to claim 2, wherein
    the overlapping detecting unit again detects the overlapping of the workpieces by using the image captured by the auxiliary image capturing device after the holding operation whenever the holding operation is performed by the robot on the overlapped workpieces, and
    the operation instruction unit instructs the robot to perform the holding operation on a top workpiece among the overlapped workpieces whenever the overlapping of the workpieces is detected by the overlapping detecting unit.

8. The picking system according to claim 7, wherein the operation instruction unit determines that the workpiece that has abnormality detected by the abnormality detecting unit is a defective when the overlapping of the workpieces is not detected by the overlapping detecting unit.

9. The picking system according to claim 7, wherein the control device starts image processing performed by the auxiliary image capturing device when the abnormality of the workpieces is detected by the abnormality detecting unit.

10. The picking system according to claim 7, wherein the control device further includes a conveyance control unit that reduces a conveyance speed of the conveying device or stops the conveying device when the abnormality of the workpieces is detected by the abnormality detecting unit.

11. The picking system according to claim 10, wherein the operation instruction unit determines that the workpiece that has abnormality detected by the abnormality detecting unit is a defective when the overlapping of the workpieces is not detected by the overlapping detecting unit.

12. The picking system according to claim 2, wherein the control device further includes a conveyance control unit that reduces a conveyance speed of the conveying device or stops the conveying device when the abnormality of the workpieces is detected by the abnormality detecting unit.

13. The picking system according to claim 12, wherein the operation instruction unit determines that the workpiece that has abnormality detected by the abnormality detecting unit is a defective when the overlapping of the workpieces is not detected by the overlapping detecting unit.

14. The picking system according to claim 1, wherein the control device further includes a conveyance control unit that reduces a conveyance speed of the conveying device or stops the conveying device when the abnormality of the workpieces is detected by the abnormality detecting unit.

15. The picking system according to claim 14, wherein the operation instruction unit determines that the workpiece that has abnormality detected by the abnormality detecting unit is a defective when the overlapping of the workpieces is not detected by the overlapping detecting unit.

16. The picking system according to claim 14, wherein the control device starts image processing performed by the auxiliary image capturing device when the abnormality of the workpieces is detected by the abnormality detecting unit.

17. A picking system comprising:
a conveying means that conveys workpieces;
a robot that performs a holding operation for holding the workpieces conveyed by the conveying means and a moving operation for moving the held workpieces to a predetermined place;
a capturing means that captures the workpieces conveyed by the conveying means;
a control means that detects the workpieces on the basis of an image captured by the capturing means and instructs the robot to perform the holding operation for holding the detected workpieces;
an abnormality detecting means that detects abnormality of the workpieces on the basis of the image captured by the capturing means and area information of the workpieces;
an overlapping detecting means that performs an edge detection process to detect overlapping of the workpieces when abnormality of the workpieces is detected by the abnormality detecting means; and
an operation instruction means that instructs the robot to perform the holding operation on the overlapped workpieces when the overlapping of the workpieces is detected by the overlapping detecting means, and that determines that the workpiece that has abnormality detected by the abnormality detecting means is defective when the overlapping of the workpieces is not detected by the overlapping detecting means.

18. A picking system comprising:
a conveying device that conveys workpieces;
a robot that performs a holding operation for holding the workpieces conveyed by the conveying device and a moving operation for moving the held workpieces to a predetermined place;
an image capturing device that is provided at an upper stream side of the conveying device than the robot to capture a transport path of the conveying device;
a control device that detects the workpieces on the transport path on the basis of an image captured by the image capturing device and instructs the robot to perform the holding operation on the detected workpieces; and
an auxiliary image capturing device that is provided near the robot or on the robot to capture the workpieces conveyed along the transport path, and
the control device including:
an abnormality detecting unit that detects abnormality of the workpieces on the basis of the image captured by the image capturing device and area information of the workpieces;
an overlapping detecting unit that performs an edge detection process on an image captured by the auxiliary image capturing device to detect overlapping of the workpieces when abnormality of the workpieces is detected by the abnormality detecting unit; and
an operation instruction unit that instructs the robot to perform the holding operation on the overlapped workpieces when the overlapping of the workpieces is detected by the overlapping detecting unit,
wherein the auxiliary image capturing device has a higher resolution than that of the image capturing device, and starts to capture the workpieces when the abnormality of the workpieces is detected by the abnormality detecting unit.

* * * * *